Patented Dec. 28, 1943

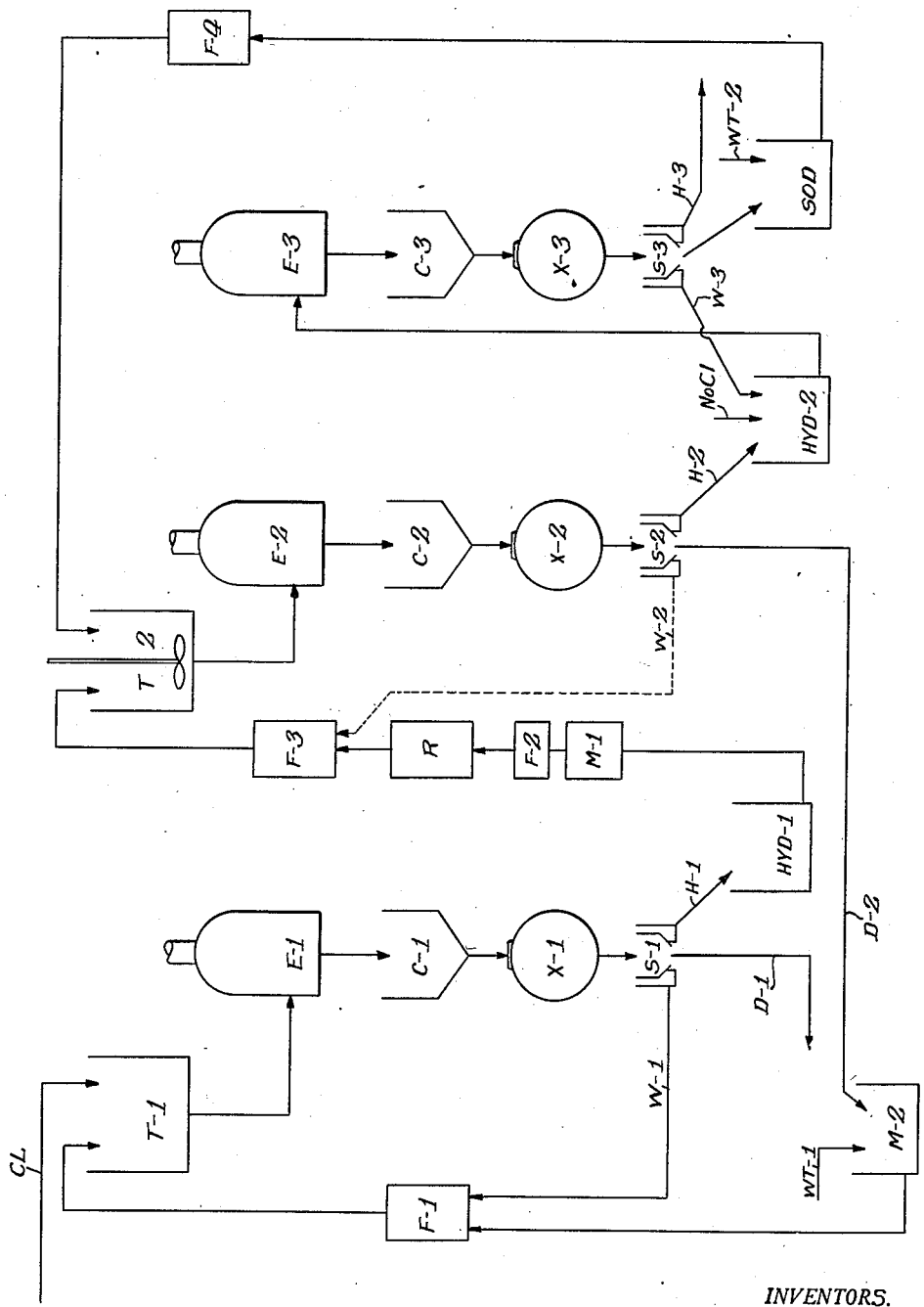

2,337,853

UNITED STATES PATENT OFFICE 2,337,853

MANUFACTURE OF DEXTROSE

Reynold P. Jurgensen and Robert V. MacAllister, Clinton, Iowa, assignors to Clinton Company, Clinton, Iowa, a corporation of Iowa Application March 15, 1943, Serial No. 479,173

4 Claims. (Cl. 127—48)

This invention relates to the treatment of hydrolyzed starch liquors for the purpose of conditioning them for subsequent processing, such as for crystallization of the crystallizable material or for further hydrolysis of hydrolyzable or incompletely hydrolyzed substances.

To illustrate the commercial uses which may be made of this invention we shall indicate how it may be used in the manufacture of dextrose syrups and the various kinds of sugars from starch, whether the starch be obtained from corn or other well-known starch bearing grains or other plant products. This invention is especially applicable to the purification of starch acid-converted liquors prior to crystallization, to starch acid-converted liquors produced for the manufacture of dextrose containing syrups, to starch acid-converted liquors intended for the manufacture of such crude sugars as the well-known "70" or "80" corn sugars, to the first and subsequent hydrols obtained during the manufacture of crystalline dextrose, to remelted sugars, and to intermediate wash waters obtained in the manufacture of syrups, crude sugars and refined dextrose, such as the wash waters from the centrifugals, bone filters, or filter presses.

For illustrative purposes, we shall describe how the invention may be used in the purification of the first hydrol remaining after the first yield of crystalline dextrose has been crystallized and removed from a starch hydrolyzed liquor produced from corn starch.

Referring to the drawing wherein is diagrammatically illustrated a typical three crystallization process for producing an exceptionally high commercial yield of dextrose hydrate, it will be observed that the hydrol remaining from the first crystallization is passed through a reconversion operation and is used in the production of the two subsequent yields of sugar, the third yield being in this instance dextrose sodium chloride, which is remelted and returned to the second crystallization from which crystalline dextrose is removed, remelted, and returned to the first crystallization stage to aid in the production of a high yield of pure crystalline dextrose hydrate. This drawing will be more fully explained hereinafter.

It is apparent from the drawing that the impurities which are normally present in the first crystallization stage eventually are carried into the second stage through the hydrol and wash water. Likewise, impurities separated at the centrifugal in the second stage are transmitted to the third stage. Such impurities as may be contained in the sugar produced by the third stage are returned to the second stage and the impurities contained in the second sugar are brought back to the first stage. Unfortunately, many of the impurities encountered are those which seriously retard crystallization or hinder either the separation of the crystallized product from the hydrol or the washing of the crystallized product. The only outlets from the entire system through which these impurities may escape are by way of the filters and the hydrol discharged from the third stage.

Our experience in operating multi-stage crystallization systems, prior to the creation of our present invention, had revealed to us that under the normal conditions of practical commercial operation these outlets do not readily eliminate the impurities at the same rate that they enter the system in the new liquor or are created in the system. Hence, there will tend to occur a gradual accumulation of impurities which increasingly interfere with the character and completeness of the first crystallization from which the marketable crystallized dextrose is obtained. In fact, not only is the first crystallization harmfully affected because of the recycling back toward it of these impurities but the crystallization in the other two stages is likewise hindered.

The problem of preventing this cyclic gain of impurities in the entire system involved determining what point or points in the system afforded opportunities for practicable changes in methods of operation. It was observed that a satisfactory filtration and reconversion of the hydrol while passing from the first stage to the second stage became more and more difficult to attain whenever the total impurities in the system was increasing, and that thereby the crystallization in the second stage was seriously retarded. The obvious expedient of neutralizing the hydrol to precipitate whatever impurities may thus be precipitated failed to solve the problem. There still remained in the liquor various impurities whose presence continued to interfere very seriously with the subsequent refining, reconversion and crystallization steps.

After considerable investigation we have discovered that it is possible to remove from the first hydrol by a novel selective absorption and flocculation treatment certain impurities which have not heretofore been removed at that point. Following this treatment the reconversion is improved, and the refining and subsequent crystallization are both facilitated to a marked extent. The impurities present in this part of the process are largely in colloidal condition and among them the water irreversible type of colloids appear to be dominant. We have found that when these impurities are thoroughly removed the cyclic gain of total impurities is stopped and the system as a whole can then be operated with a high degree of success.

As a specific example of the application of our invention to the treatment of a first hydrol, we treat 2000 gallons of 20 Bé. first hydrol (measured at 100° F.) in the following manner: to the hydrol we add 1.37 pounds of phosphoric acid, and 4 pounds of commercial tannin. The pH of the solution is then adjusted to about 7.0 to 7.4 by adding as much hydrated lime, Ca(OH)$_2$, as is necessary to accomplish that change. The mixture is then heated and agitated to increase the extent of the reactions. We have found that at about 145° F. temperature half an hour of agitation is generally sufficient, but that the temperature of the mixture may range from room temperature up to about 175° F. As the temperature is increased above room temperature, the interval of treatment prior to filtration may be proportionately decreased.

Thereupon some suitable filter aid may be added to the mixture, i. e., a diatomaceous earth, or any other well-known filter aid of the same general characteristics. This mixture may then be pumped through a filter press after which the filtrate which is to be reconverted will have its pH adjusted to about 5.0. Because of the removal of impurities (amphoteric) the quantity of HCl required for the pH adjustment is very small. The liquor thus treated may then be reconverted in accordance with the usual reconversion practice and delivered to the second sugar system.

We have found that the dextrose ratio after reconversion of a first hydrol treated in accordance with our invention as above described will be from two to three per cent higher than can be obtained without such treatment. The hydrol so treated is found to be decolorized to a greater extent by the bone char filters and the second sugar crystallization is improved both in character of crystal formation and in yield. It follows that if the second sugar is then returned to the first sugar system to be remelted and recrystallized with fresh hydrolized starch liquor, the first sugar will be improved both as to yield and quality.

While we do not wish to be bound or limited by any statement of our theory as to why these improved results are obtained, it appears reasonable to assume that the tannic acid combines with metals such as iron which may be present to form iron tannate or with other metals to form other metal tannates, and combines with the calcium in the mixture to form calcium tannate, the latter being a good adsorbent itself. The tannin also combines with nitrogenous matter present to form precipitates. It is believed that the phosphoric acid combines with the lime to form insoluble tri-calcium phosphate, another good adsorbent, and that this acid also combines with the metals to form insoluble precipitates.

Obviously it cannot be stated with precision the extent to which each ingredient in the solution contributes to the total result obtained. Nor are we prepared to state in simple terms why the color and clarity of the liquor are improved, the production of crystallizable dextrose by reconversion rendered more extensive, and why the subsequent crystallization is generally improved both in quality and yield. The improved net results, whatever their cause, are, however, uniformly obtained and clearly apparent.

The drawing will now be referred to briefly as being illustrative, diagrammatically, of a three stage dextrose crystallization process to which this invention is applicable. The temperatures and densities, which are employed in the several stages of the process, do not form a part of this invention. Reference may be had to the Wagner & Stern Patent 2,150,197, issued March 14, 1939, for an indication of temperatures, densities and details of procedure, which may be satisfactorily employed in a process of the character described.

The line CL indicates the original starch converted dextrose solution which is introduced into storage tank T—1. As will appear later, remelted sugar from the second stage and wash water from the first stage are also introduced into this tank. E—1 represents the evaporator in which the dextrose solution is reduced to the desired density. C—1 is the cooler in which the liquor is cooled to a desired temperature before introduction into the crystallizer X—1. The crystallized solution is delivered to a spinner S—1 and the crystalline hydrate dextrose, after suitable washing, is then ready to be dried and prepared for the market, being discharged from the system as indicated by line D—1. The wash water, represented by the line W—1, is preferably sent to the filter F—1.

The first hydrol, indicated by the line H—1, goes to the tank HYD—1 and thereafter to the mixing tank M—1, where the treatment, above described, in accordance with this invention, is undertaken, namely the addition of phosphoric acid, tannin, and lime. The treated hydrol is then delivered to a filter F—2, as described above, and is then reconverted at R, filtered again at F—2 and delivered to the tank T—2. Here it is mixed with an aqueous solution made from the dextrose sodium chloride which the third stage produces. This solution is evaporated in E—2, cooled in C—2, crystallized in X—2 and spun in S—2. The crystalline cake, hydrate dextrose, is then delivered preferably to the tank M—2, water being added to it through line W$t$—1 to dissolve the sugar. This re-melted sugar is then filtered at F—1 and sent to tank T—1. The wash water from the second stage may be sent to the filter F—3 or may accompany either the sugar going to the re-melting tank or the hydrol indicated by line H—2, which is sent to tank HYD—2.

As explained in the above mentioned Wagner & Stern patent, sodium chloride is added in the tank to which the second hydrol is directed for the purpose of subsequently producing a crystalline product known as dextrose sodium chloride. After the evaporation in the third stage at E—3, the cooling at C—3 and the crystallization at X—3 have taken place, the dextrose sodium chloride is centrifugally separated in the spinner S—3 and the cake delivered to the tank SOD. The wash water may be sent by the line W—3 to the tank HYD—2, while the hydrol represented by line H—3 may then be discharged from the system. Water is added as indicated by line W$t$—2 to the double salt in the tank SOD to dissolve the same after which a filtration of the solution is preferably conducted in the filter F—4, before the aqueous solution is returned to the tank T—2. For a further explanation of the steps, one may refer to the above mentioned Wagner & Stern patent.

In the example of the treatment process, which we have stated above, we have said that commercial phosphoric acid (H$_3$PO$_4$) is employed. However, we may use soluble phosphates, for example sodium or potassium phosphates, which will react with lime to form insoluble calcium phosphates such as di-calcium or tri-calcium phosphates, that is, those materials which will furnish phosphate ions or acid phosphate ions in solution. Or the insoluble calcium phosphate may be added directly. Where in the claims phosphatic material is mentioned, we refer to any of the above named phosphates or phosphoric acid, which may be employed interchangeably in the process.

The tannin which was specified above may be commercial tannin or crude tannin, or in place of these we find that commercial tannic acid or pure tannic acid may be used. Where in the claims a tannic reagent is mentioned, it should be understood that tannic acid or tannin are referred to as equivalents in this process.

In place of the slaked lime suggested in the specification it would be possible to use magnesium hydroxide.

While a pH range of 7.0 to 7.4 is preferred in the treatment of the liquor a pH between 6.0 and 7.0 may be used, but less effectively. The pH should not, however, greatly exceed 7.4 for at higher pH's a certain amount of chemical change or destruction of the dextrose and maltose may take place together with enolization and epimerization. The term "approximate neutrality" when employed in the claims hereinafter refers to a pH within the indicated narrow range on either side of 7.0 for the reasons stated above, and should not be confused with partial neutralizing to about 5.0 pH, which has been customary in the past following a conversion and preliminary to a filtration in preparation for crystallization.

Where in the claims, hereinafter, it is stated that precipitated material is removed from the solution this term is intended to include not only truly precipitated material but flocculated, coagulated, adsorbed colloids.

We have found that by using a clarifying or treatment process in accordance with this invention, the dextrose equivalent of reconverted hydrol is easily raised 2% or 3% higher than it would be were this step omitted. Furthermore, the liquor which is thereafter de-colorized in the bone char filter shows a marked increase in clarity and improvement in color. The second stage crystallization is improved, both in quality and yield. Hence, less impurities are returned to the first stage when the second sugar is remelted.

Again we call attention to the fact that while we have described for illustrative purposes the treatment of a first hydrol, this invention may be used for clarifying other dextrose containing liquors which may contain impurities whose removal is desirable and may be effected by means of this invention.

Where the claims refer to dextrose-containing hydrolyzed starch liquors, the various dextrose liquors described earlier in this specification are referred to. Because of the number and diverse character of the impurities which are present in liquors intended to be treated in accordance with this invention, as described heretofore, the claims for the sake of brevity will not individually identify the impurities but may refer to all of them merely as the impurities present.

This application is a division and continuation in part of our co-pending application Serial Number 282,178 filed June 30, 1939, for U. S. Letters Patent on "Manufacture of dextrose," which application claims a process in which starch is used in addition to the ingredients herein claimed.

It should be understood that the invention as applied to a process of this character is susceptible of considerable variation and modification. Furthermore, the invention may be used with great advantage in a process which produces merely a yield of dextrose in the third stage instead of dextrose sodium chloride, which we have mentioned. All such modifications and variations are contemplated and are intended to be claimed. Having shown and described our invention, we claim:

1. In the purification of dextrose-containing hydrolyzed starch liquors, the improvement consisting in mixing with the liquor, tannin to combine with the metals and nitrogenous matter present, phosphoric acid to combine with the metals, and sufficient of an alkaline material from the group consisting of calcium and magnesium hydroxide to bring the total mixture to approximate neutrality to facilitate all the reactions, maintaining the liquor during treatment at temperatures ranging from room temperature to not substantially exceeding 175° F. and thereafter separating the precipitated floc from the liquor.

2. In the purification of dextrose-containing hydrolyzed starch liquor, the improvement consisting in mixing with the liquor, tannin to combine with the metals and nitrogenous matter present and with some of the added calcium or magnesium, phosphoric acid to combine with the metals and with some of the added calcium or magnesium, and sufficient of an alkaline material from the group consisting of calcium and magnesium hydroxide to bring the total mixture to approximate neutrality to facilitate all the reactions, maintaining the liquor during treatment at temperatures ranging from room temperature to not substantially exceeding 175° F., and thereafter separating the precipitated floc from the liquor.

3. In the purification of dextrose-containing hydrolyzed starch liquors, the improvement consisting in mixing with the liquor, tannin, phosphoric acid, and sufficient of an alkaline material from the group consisting of calcium and magnesium hydroxide to bring the total mixture to approximate neutrality, sufficient tannin and phosphoric acid being used in the presence of the alkaline material to effect precipitation of substantially all of the metals and nitrogenous impurities present, maintaining the mixture during treatment at temperatures ranging from room temperature to not substantially exceeding 175° F., and thereafter separating the precipitated floc from the liquor.

4. In the purification of dextrose-containing hydrolyzed starch liquors, the improvement consisting in mixing with the liquor, tannic reagent to combine with metals and nitrogenous matter present, phosphatic material to combine with the metals, and sufficient of an alkaline material from the group consisting of calcium and, magnesium hydroxide to bring the total mixture to approximate neutrality to facilitate all the reactions, maintaining the liquor during treatment at temperatures ranging from room temperature to not substantially exceeding 175° F., and thereafter separating the precipitated floc from the liquor.

REYNOLD P. JURGENSEN.
ROBERT V. MacALLISTER.